Aug. 15, 1961  F. L. BREVEGLIERI ET AL  2,996,305
SUSPENSION SYSTEM FOR TRACK TYPE VEHICLES
Filed April 7, 1959  2 Sheets-Sheet 2

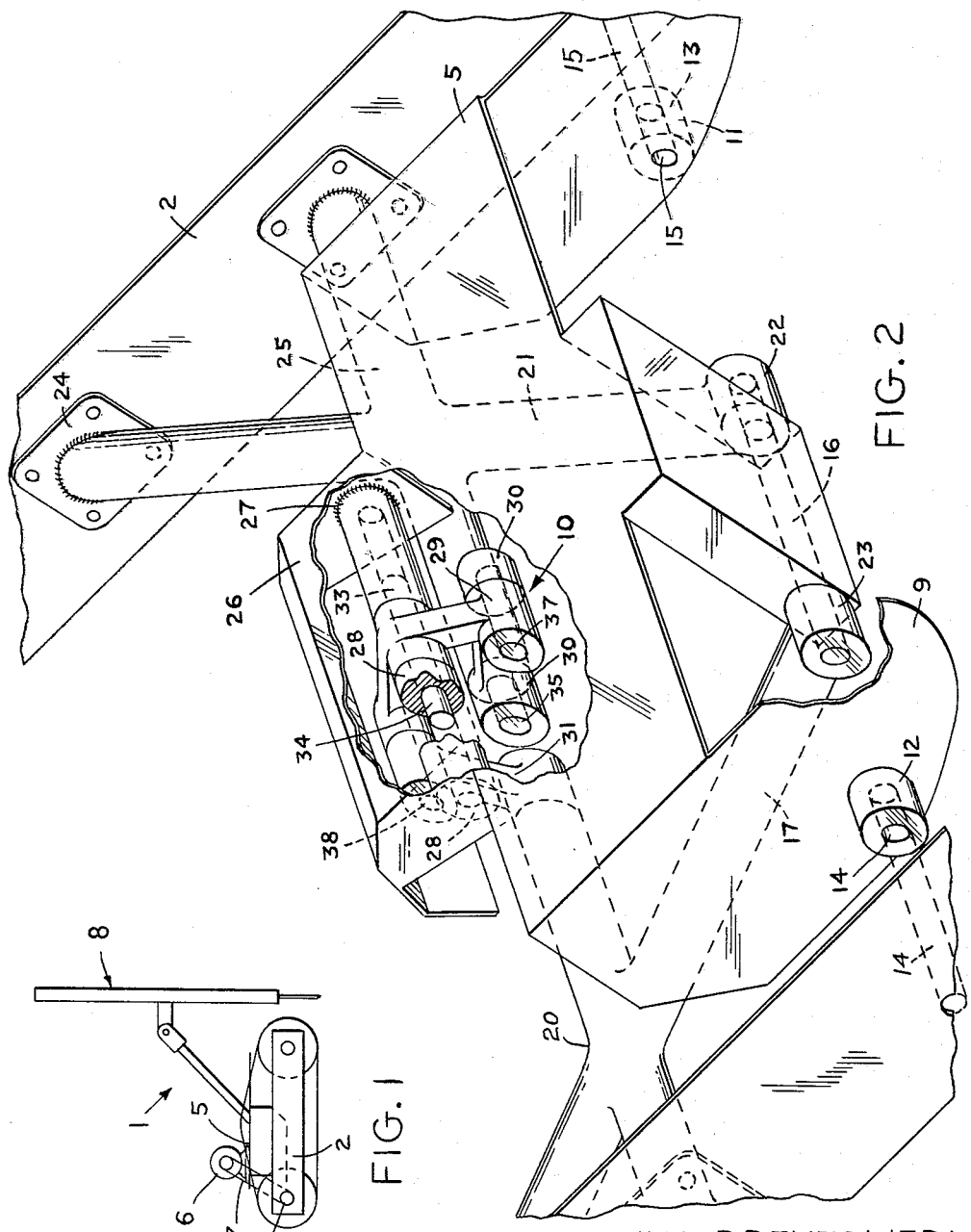

FRANKLIN L. BREVEGLIERI
WILLIAM C. ROSE
INVENTORS

BY *Daniel H. Bobis*
*Atty*

United States Patent Office
2,996,305
Patented Aug. 15, 1961

2,996,305
SUSPENSION SYSTEM FOR TRACK TYPE VEHICLES
Franklin L. Breveglieri, Agawam, and William C. Rose, Longmeadow, Mass., assignors to Worthington Corporation, Harrison, N.J., a corporation of Delaware
Filed Apr. 7, 1959, Ser. No. 804,617
9 Claims. (Cl. 280—6)

This invention relates to rock drilling machinery of the self-propelled type and more particularly to the suspension systems of said machinery.

The suspension system of a track type vehicle as contemplated herein must perform the duty of compensating for ground irregularities by substantially minimizing the amount of track movement transmitted to the frame of the vehicle. For best operation, it is desirable to maintain the frame in a substantially level position regardless of track movement and in addition, to this leveling function, it is desirable that the suspension system resist forces tending to spread the tracks in or out. There are a number of suspension system currently employed in the art for these purposes which, together with the present invention, are rather generally based on the same fundamental conception. Thus, there is a frame mounted between a pair of tracks and means operatively interconnecting the tracks to the frame whereby movement of the frame relative the tracks is held to a minimum.

Within the broad limits just defined, there is much room for improvement in suspension systems utilized in rock drilling machinery. From a practical standpoint many of the systems employed embody services which are complex, expensive to manufacture and maintain.

The present invention eliminates the foregoing objections and provides a suspension system for track type vehicles of the rock drill type which also maintains the frame in as nearly a level position as possible regardless of the track movement.

More particularly this is accomplished with the hereinafter described suspension system as follows: During movement of one track upwardly or downwardly, due to obstacles on the terrain, the linkage arrangement of the suspension system is constructed to limit movement of the frame to half the movement of the track. Should obstacles in the terrain cause upward movement of one track and downward movement of the other track it will be evident that there is no movement of the frame.

It is a further object of this invention to provide a suspension system for the rock drill contemplated herein to cause same to maintain a maximum amount of ground contact area in order to provide maximum tractive effort therefor in operation over rough terrain.

Other advantages and objects will appear in the accompanying detailed description of the preferred form of the invention as illustrated in the following drawings:

FIGURE 1 is a side view showing a rock drill carriage of the self-propelled type.

FIGURE 2 is a fragmentary perspective view showing one form of suspension system mounted in operating position.

Figure 3:
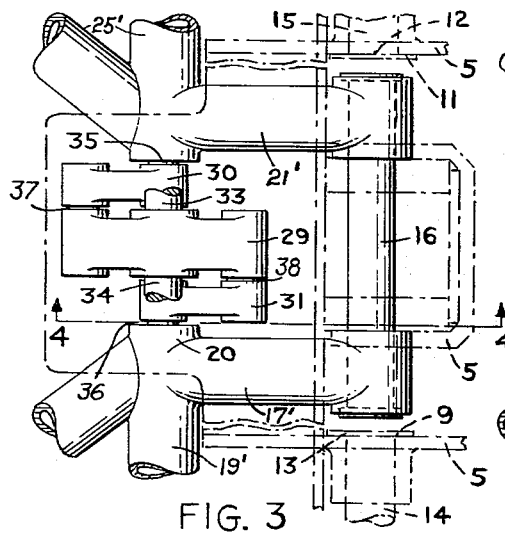
FIGURE 3 is a fragmentary top view of another form of suspension system.

Referring to the drawings, FIGURE 1 shows a rock drill supporting carriage of the self-propelled type generally designated 1 including a pair of track-laying frames 2 and 3 laterally spaced apart and operatively connected together at the rearward portions thereof by means, such as an axle 4, which permits the tracks to move in a vertical plane and about said means, independently of one another. A frame or deck 5 is movably mounted in spaced relation with the track frames 2 and 3 and usually therebetween, as will be described in detail hereinafter, on the suspension system contemplated by this invention. As is customary in the art the frame 5 is adapted to accommodate the usual driving means 6, for the vehicle, which is operatively connected to the tracks to drive same through a driving gear or chain 7. Both the means for interconnecting the track frames 2 and 3 and the driving means for propelling these tracks are shown diagrammatically in the drawing as these particular facets of the art are well advanced and well known to the skilled technician. The frame 5 also accommodates the drilling ring shown at 8 in FIGURE 1, and as is customary, the rig 8 is movably mounted on the frame to permit rapid hole spotting from a single location.

In order to minimize the movement of the frame relative the tracks and to prevent misalignment of the track frames 2 and 3 during operation thereof, a suspension system, generally designated 10, is contemplated which intimately, operatively interconnects these tracks, through the track frames 2 and 3 to the deck 5.

As was mentioned hereinabove, the track frames were laterally spaced apart and interconnected by means shown diagrammatically at 4 in FIGURE 1. Such means usually take the form of an axle or the like which extends the span between the frames 2 and 3. However, in the preferred embodiment the frame 5 and suspension system 10 are adapted to operatively interconnect the tracks, through the track frames 2 and 3.

The frame 5 is movably mounted at the rearward portion of the drill carriage 8", as for example, by pivotably connecting the rear side portions 9 and 11 of the frame to the track frame by any well known method such as by bracket means 12 and 13 mounted respectively about stub shafts 14 and 15 which are a part of the track frames.

Means, taking the form of a cross-shaft 16, is mounted in the rearward central portion of the frame and in axial alignment with the axis of the stub shafts 14 and 15.

A first beam member 17 is pivotally mounted about the cross-shaft at 23 and extends forward at a predetermined angle with the track frame 3 and is rigidly connected thereto at its forward end through means taking the form of a bracket 18. A first support member 25 being parallel to the cross-shaft 16 is provided and near the central portion 20 of the beam 17 to provide further stability for the machine during operation thereof. Similarly, a second beam 21 is pivotably mounted about the cross-shaft 16 at 22 and extends along the track frame 2 and is rigidly connected thereto at its forward end by bracket means 24. A support member 25 which is parallel to cross-shaft 16 is also provided for beam 21 in order to provide for the desired rig stability.

The frame at its forward end 26 includes brackets 27 and 28 adapted to pivotably receive lever means 29 which is connected respectively to beams 17 and 21 by links 31 and 30 through support member 25.

Figure 4:
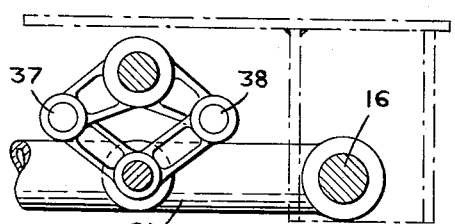
FIGURE 4 is a fragmentary side view of the suspension system taken on line 4—4 of FIGURE 3.

As shown in further detail in FIGURES 3 and 4, the brackets 27 and 28 of FIGURE 2, accommodate the lever means 29 shown as a bell-crank through pin means 33 which may take the form of a single shaft.

The form of suspension system shown in FIGURES 3 and 4 resembles the form shown in FIGURES 2 except that a portion of the beams 17' and 21' are parallel to the track frames 2 and 3 rather than at an angle with said frames as is the case with the embodiment shown in FIGURE 2. It is believed that further detailed description directed to the lever means and linkage means operatively interconnecting the beams 17 and 21 of the embodiment shown in FIGURE 2 will be more readily understood by referring to the detailed drawings shown in FIGURES 3 and 4. Those parts having generally the same construction and purpose as coresponding parts in FIGURE 2 have been given the same reference characters.

The links 30 and 31 are pivotably connected at one end to the beams and adjacent the support members 19 and 25 through pin means 35 and 36 located on the inner face of the beams and at the other end to the respective ends of the bell-crank lever 29 which is provided with pin members 37 and 38.

Provision for mounting the frame 5 as above described provides the necessary stability that is essential for the effective operation of the machine contemplated herein.

Figure 5:
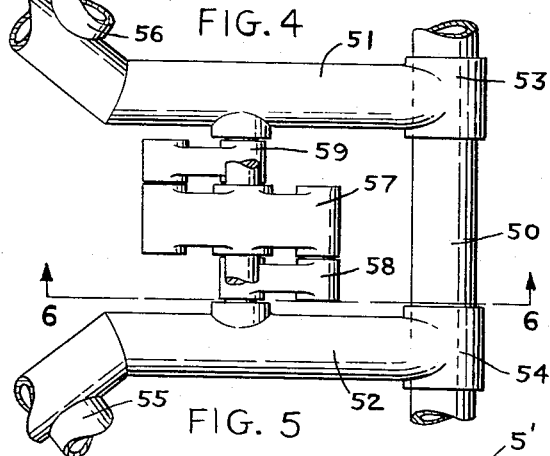
FIGURE 5 is a fragmentary top view of another form of suspenison system.
Figure 6:
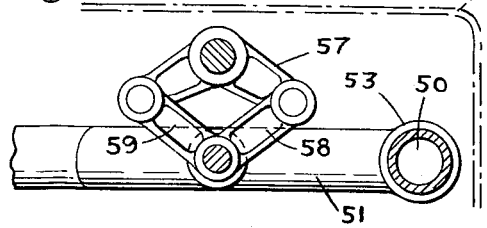
FIGURE 6 is a fragmentary side view of the suspension system shown in FIGURE 5 and taken on lines 6—6.

The form of the invention shown in FIGURES 5 and 6 differs in some degree from the form shown in FIGURES 3 and 4 but the principles of operation and the general principles of construction are similar.

This form of the invention includes a cross-shaft 50 which is connected to the track frames and provides an axis which functions as the pivot point for the tracks. A first and second beam members 51 and 52 are connected respectively to each of the track frames through brackets at the forward end thereof and are pivotably mounted through collars 53 and 54 about the cross-shaft 50. Support means 55 and 56 extend from each beam and are also connected to the track frames through brackets similar to those shown in FIGURE 2.

A bell-crank lever 57 of the form described above is mounted in the forward portion of the frame 5' and is pivotally connected to each of the beams 51 and 52 through links 58 and 59.

Figure 7:
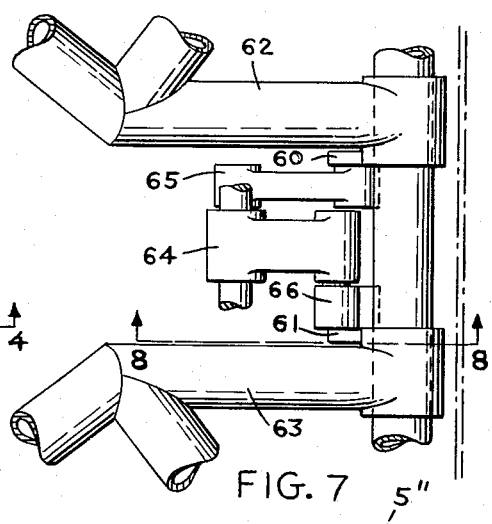
FIGURE 7 is a fragmentary top view of another form of suspension system.
Figure 8:
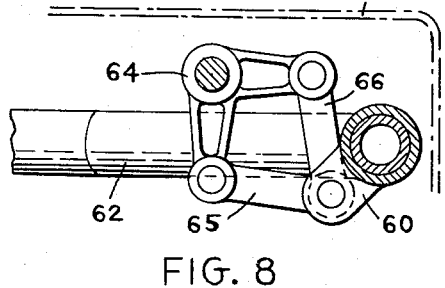
FIGURE 8 is a fragmentary side view of the suspension system shown in FIGURE 7 and taken on lines 8—8.

FIGURES 7 and 8 show a modified form of suspension means shown in FIGURES 5 and 6. Except for providing cranks 60 and 61 on beams 62 and 63 and about the cross-shaft and interconnecting the bell-crank lever 64 to the frame 5" and to the cranks 60 and 61 through links 65 and 66, the construction shown in FIGURES 7 and 8 is otherwise identical to that shown in FIGURES 5 and 6 of the drawings and described in detail hereinabove.

Provision of a suspension system as described hereinabove will limit the movement of the frame 5 relative the tracks as those tracks encounter obstacles as they move over rough ground.

More particularly and in operation, upward movement of one track frame which may be caused by an obstruction on the terrain, and for purposes of clarity we will refer to frame 2, causes upward movement of beam 21 and rotation thereof about cross-shaft 16 at 22. Beam 22 in turn moves lever 30 pivotally connected thereto as at 35. Lever 30 in turn transmits movement to bell crank lever 29. Bell crank lever 29 being pivotably connected to frame 5 at 33 and 34 causes the frame to move upwardly one-half the movement of the track frame 2. This is evident because the bell crank is pivotably connected to the lever 31 at its other end 38 and since lever 31 is pivotable about beam 20 as at 36 frame movement is affected without a concomitant movement of the other track frame 3.

Furthermore, with the above described suspension system and during operation on terrain causing upward movement of one track and downward movement of the other track, it will be evident that there is no movement of the frame.

It will be understood that the invention is not to be limited to the specific construction or arrangement of parts shown, but that they may be widely modified within the invention defined by the claims.

What is claimed is:

1. A suspension system for a track type vehicle having a pair of track means laterally spaced apart, a frame mounted in spaced relation with the track means of said vehicle, said suspension system comprising beam members rigidly connected to the track means at one end and operatively connected to the rearward portion of the frame at the end remote from the end connected to the track means, lever means operatively connected to the frame at the forward portion thereof, linkage means for interconnecting the beam members to the lever means whereby movement of the frame relative movement of the tracks is substantially minimized, and said linkage means and lever means during oscillation defining an arc being in a plane that is parallel to the plane defined by the arcs transcribed by said track means during oscillation.

2. A track type vehicle including first and second tracklaying frames laterally spaced apart, means for said first and second track frames to permit pivotal movement of said track frames about the rearward portions thereof, a frame mounted in spaced relation with the tracks of said vehicle, means for suspending said frame relative said track frames whereby movement of said frame relative said track frames is substantially minimized, said last mentioned means comprising first and second beam members rigidly respectively connected to the track frames at one of the ends thereof and operatively connected to the rearward portion of the frame at the other ends, and lever means interconnecting the first and second beam members between the ends thereof to the frame so that said lever means during oscillation defines an arc in a plane that is parallel to the plane defined by the arcs transcribed by said track frames during oscillation.

3. A suspension system for a track type vehicle having a pair of track means laterally spaced apart, axle means at the rearward portion of said track means to permit pivotal movement of said track means about said axle means, said suspension system comprising a cross-shaft mounted between said track means the axis thereof being in alignment with the axis of said axle means, a first beam member rigidly connected at its forward end to one of said track means and at the other end pivotally mounted of said cross-shaft, a second beam member rigidly connected at its forward end to the other track means and at the other end pivotably mounted on said cross-shaft, a frame pivotably mounted at the rearward portion thereof to said cross-shaft, lever means operatively connected to the frame at the forward portion thereof, linkage means for interconnecting each of said beam members to the lever means whereby movement of the frame relative the movement of the tracks is substantially minimized, and said linkage means and lever means during oscillation defining arcs being in a plane that is parallel to the plane defined by the arcs transcribed by the track means during oscillation.

4. A suspension system for a track type vehicle having a pair of track means laterally spaced apart, axle means at the rearward portion of said track means and operatively interconnecting said track means and to permit pivotal movement thereof about said axle means, said suspension system comprising a cross-shaft mounted between said track means, a first beam member rigidly connected at its forward end to one of said track means and at the other end pivotably mounted on said cross-shaft, a second beam member rigidly connected at its forward end to the other track means and at the other end pivotably mounted on said cross-shaft, a frame pivotably mounted at the rearward portion thereof to said cross-shaft, lever means operatively connected to the frame at the forward portion thereof, linkage means for interconnecting each of said beam members to the lever means whereby movement of the frame relative movement of the tracks is substantially minimized, and said linkage means and lever means during oscillation defining arcs being in a plane that is parallel to the plane defined by arcs transcribed by said track means during oscillation.

5. A suspension system for a track type vehicle having a pair of track-laying frames laterally spaced apart, a cross-shaft interconnecting said track-laying frames and permitting pivotal movement thereof about said cross-shaft, said suspension system comprising a first beam member rigidly connected at its forward end to one of said track-laying frames and at its rearward end pivotably mounted on said cross-shaft, a first support member extending from the forward end of said first beam and rigidly connected to said track, a second beam member rigidly connected at its forward end to the other track-laying frame and its rearward end pivotably mounted on said cross-shaft, a second support member extending from the forward end of said second beam and rigidly connected to said track, a frame pivotably mounted at the rearward portion thereof to said cross-shaft, a bell-crank lever pivotably connected at the central portion thereof to said frame, a first link pivotably connected at one end to said first beam and pivotably connected at its other end to one of the ends of said bell-crank lever, a second link pivotably connected at one end to said second beam and pivotably connected at its other end to the other end of said bell-crank lever whereby movement of the frame relative the movement of the tracks is substantially minimized, and said bell-crank lever, first and second link during oscillation defining arcs being in a plane that is parallel to the plane defined by arcs transcribed by said track means during oscillation.

6. A suspension system for a track type vehicle having a pair of track-laying frames laterally spaced apart, a cross-shaft interconnecting said track-laying frames and permitting pivotal movement thereof about said cross-shaft, said suspension system comprising a first beam member rigidly connected at its forward end to one of said track-laying frames and at its rearward end pivotably mounted on said cross-shaft, a first support member extending from the forward end of said first beam and rigidly connected to said track, a second beam member rigidly connected at its forward end to the other track-laying frame and at its rearward end pivotably mounted on said cross-shaft, a second support member extending from the forward end of said second beam and rigidly connected to said track, a frame pivotably mounted at the rearward portion thereof to said cross-shaft, a first crank on said cross-shaft and movable with said first beam, a second crank on said cross-shaft and movable with said second beam, a bell-crank lever pivotably connected at the central portion thereof to said frame, a first link pivotably connected at one end to said first crank and at its other end pivotably connected to one end of the bell-crank lever, a second link pivotably connected at one end to said second crank at its other end being pivotably connected to the other end of said bell-crank lever whereby movement of the frame relative the movement of the tracks is substantially minimized, and said first and second cranks, said bell-crank lever, said first and second links during oscillation defining arcs being in a plane that is parallel to the plane defined by arcs transcribed by said track means during oscillation.

7. A suspension system for a track type vehicle having a pair of track means laterally spaced apart, means at the rearward portion of said track means to permit pivotal movement thereof about said means, said suspension system comprising a cross-shaft mounted between said track means the axis thereof being in alignment with the axis of said means to permit pivotal movement of the track means, a first beam member rigidly connected at its forward end to one of said track means and at the other end pivotably mounted on said cross-shaft, a first support member connected substantially centrally of said first beam at one end and to said track at the other end and said first support member being parallel to said cross-shaft, a second beam member rigidly connected at its forward end to the other track means and at its rearward end pivotably mounted on said cross-shaft, a second support member connected substantially centrally of said second beam at one end and to said track at the other end and said second support member being parallel to said cross-shaft, a frame pivotably mounted at the rearward portion thereof to said cross-shaft, a bell-crank lever pivotably connected at the central portion thereof to said frame, a first link pivotably connected at one end to the central portion of said first beam and at its other end pivotably connected to one of the ends of said bell-crank lever, a second link pivotably connected at one end to the central portion of said second beam and at its other end to the other end of the bell-crank lever whereby movement of the frame relative the movement of the tracks is substantially minimized, and said bell-crank lever, said first and second links during oscillation defining arcs being in a plane that is parallel to the plane defined by arcs transcribed by said track means during oscillation.

8. The suspension system claimed in claim 7 wherein said first and second beam members form acute angles with said track means.

9. The suspension system claimed in claim 7 wherein said first and second beam members are parallel to said track means.

References Cited in the file of this patent

UNITED STATES PATENTS

| | | |
|---|---|---|
| 2,705,175 | McIntyre | Mar. 29, 1955 |
| 2,828,137 | Wagner | Mar. 25, 1958 |
| 2,863,516 | Peterson | Dec. 9, 1958 |

FOREIGN PATENTS

| | | |
|---|---|---|
| 664,922 | Germany | Sept. 8, 1938 |